United States Patent Office 3,294,491
Patented Dec. 27, 1966

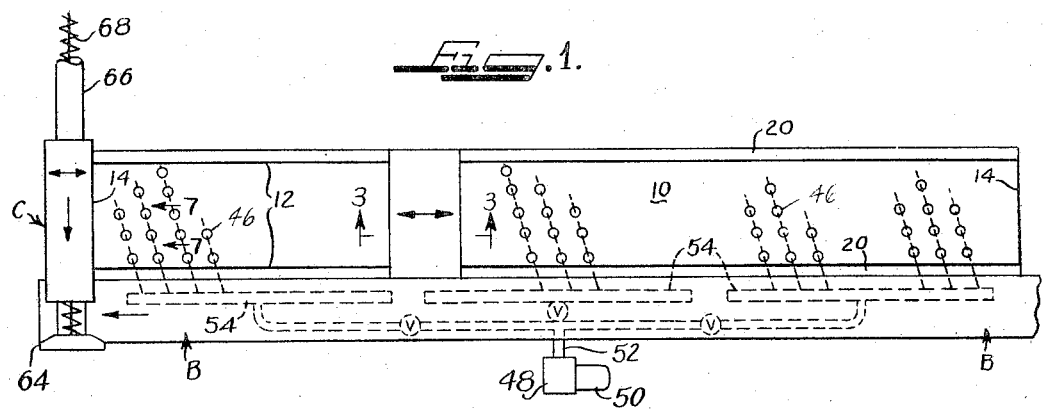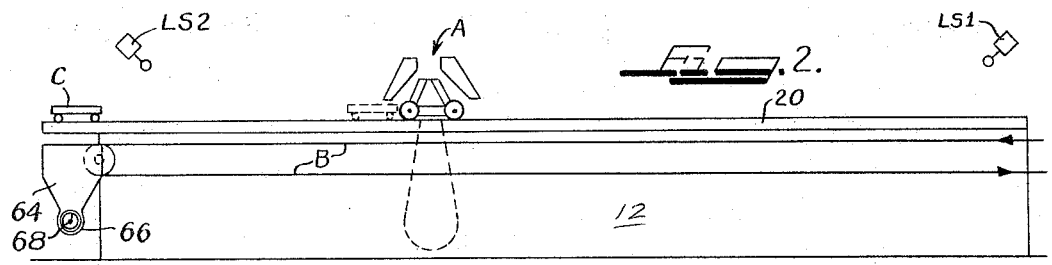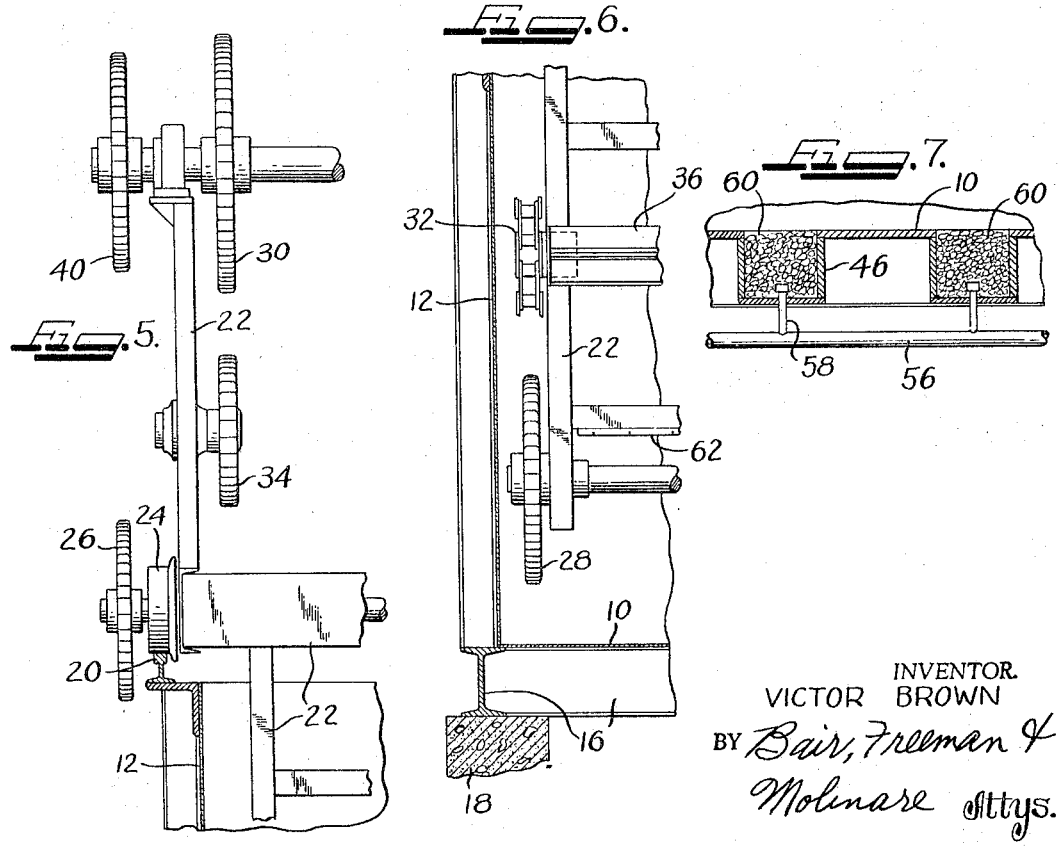

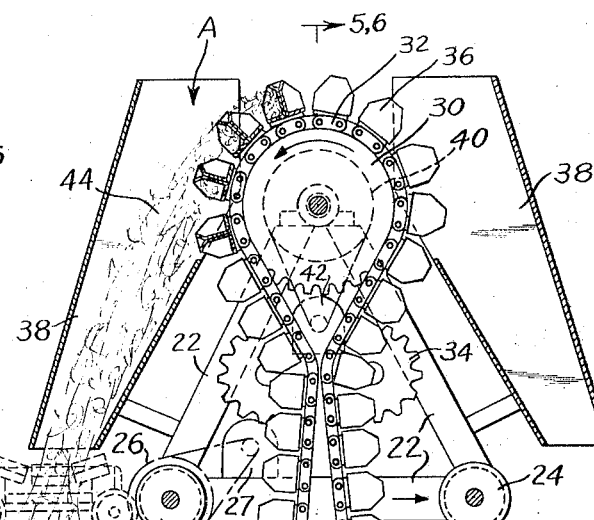
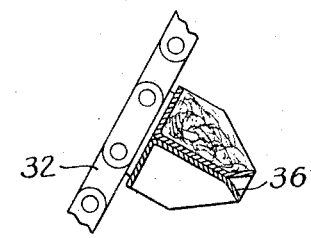
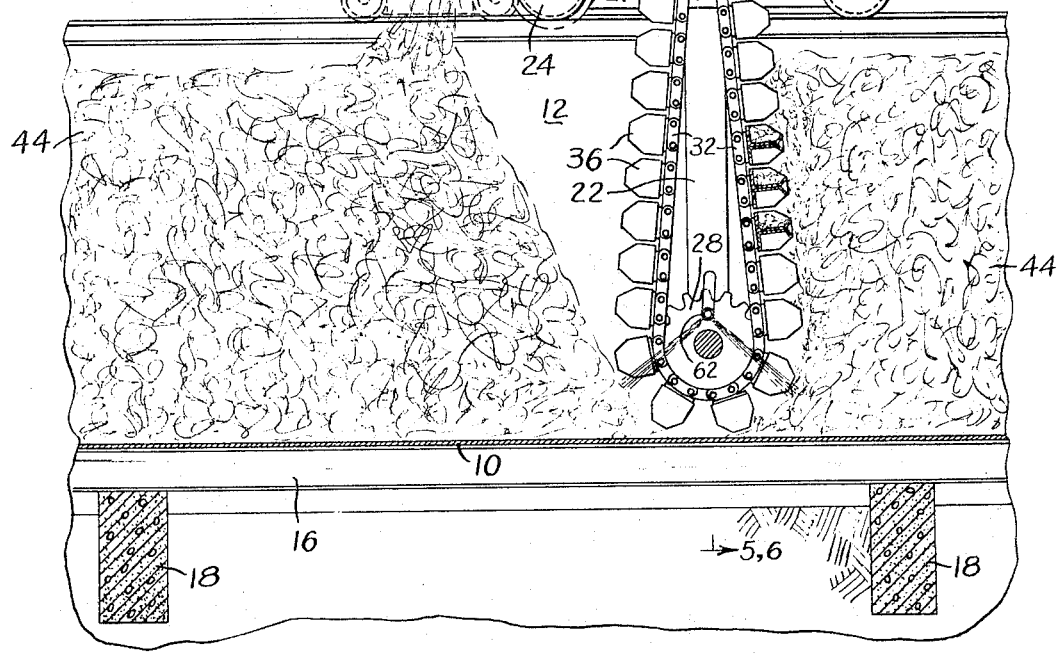

3,294,491
COMPOSTING APPARATUS
Victor Brown, Elmhurst, Ill., assignor to New Life Foundation, Wheaton, Ill., a not-for-profit corporation of Illinois
Filed Apr. 6, 1964, Ser. No. 357,423
8 Claims. (Cl. 23—259.1)

This invention relates to composting apparatus and particularly to one which is designed for complete aerobic digestion of waste organic material such as garbage, the apparatus being of batch-type and capable of operation throughout the entire range of mesophilic and thermophilic digestion as well as cooling out and partial drying according to the method for the production of organic soil conditioners set forth in the copending application of Walker and Redd, Ser. No. 211,372, filed July 20, 1962 and now abandoned.

One object of the invention is to provide an apparatus which is comparatively simple and inexpensive to construct and operate.

Another object is to provide an apparatus comprising an elongated tank and an agitator wherein the agitator laterally spans the tank and is designed to travel longitudinally of the tank and in alternately opposite directions for progressively elevating the organic material in the tank to a position above the level of the material for aeration and mixing whereupon it is discharged back into the tank behind the traveling agitator.

Still another object is to provide an agitator in the form of a wheeled frame or carriage which travels along rails at the side of the tank and has a vertical bucket-type elevator spanning the tank which on the front side elevates the material and discharges it on the rear side, the elevator operating in a gap of the organic material and effectively aerating the same in a progressive manner which between passes of the agitator leaves the material undisturbed for further aerobic digestion processes to proceed.

A further object is to provide means for removing the organic material from the tank comprising a lateral conveyor which travels on the rails with the agitator to receive the material therefrom and discharge it to one side of the tank where another conveyor extending longitudinally of the tank receives the material and conveys it beyond the end of the tank.

Still a further object is to provide means for efficiently introducing additional water to the organic material in the form of spraying means carried by the agitator itself.

An additional object is to provide means for aerating the material in the tank independent of the aeration resulting from the operation of the agitator comprising a plurality of air diffusion pots distributed throughout the bottom of the tank and to which air is supplied.

With these and other objects in view, my invention consists in the construction, arrangement and combination of the various parts of my composting apparatus, whereby the objects above contemplated are attained, as hereinafter more fully set forth, pointed out in my claims and illustrated in detail on the accompanying drawings, wherein:

FIG. 1 is a diagrammatic plan view of a composting apparatus embodying my invention;

FIG. 2 is a diagrammatic side elevation thereof;

FIG. 3 is a vertical detailed sectional view taken on the line 3—3 of FIG. 1;

FIG. 4 is an enlarged cross section through one of the buckets of the conveyor of the agitator;

FIGS. 5 and 6 are an enlarged vertical sectional view on the line 5, 6—5, 6 of FIG. 3 showing the frame, shaft arrangement and sprockets of the agitator, FIG. 6 being a continuation of the lower end of FIG. 5, and FIG. 7 is an enlarged sectional view on the line 7—7 of FIG. 1 showing details of air diffusion pots.

On the accompanying drawings I have used the reference numeral 10 to indicate the bottom of an elongated tank, 12 the sides thereof and 14 the ends thereof. The tank 10, 12, 14 may be formed of sheet steel or the like in a size such as 12 feet wide and 120 feet long, for instance. The size, of course, may be varied to suit requirements. The tank may be supported on I-beams 16 or the like shown in FIGS. 3 and 6 and a suitable foundation shown at 18.

Along the sides 12 of the tank 10, 12, 14 I provide a pair of rails 20. An agitator A and a conveyor C are adapted to travel along the rails 20. The agitator A comprises a suitable framework or carriage shown in FIGS. 4, 5 and 6 and the various parts thereof being indicated at 22 which is supported by wheels 24 on the rails 20. In FIG. 5 a sprocket 26 is shown which may be driven by a motor 27 as shown in FIG. 3 for propelling the agitator A.

The frame 22 is provided with lower sprockets 28 and upper sprockets 30 adjacent each side 12 of the tank, and sprocket chains 32 extend therearound and around idlers 34 as shown in FIG. 3. The chains 32 carry elevator buckets 36, the details of which are best shown in FIGS. 4 and 6 to provide an elevator of the endless type. FIG. 6 shows the ends of the buckets terminating relatively close to the walls 12 so that the buckets substantially span the tank laterally for elevating the organic material 44 therein as will hereinafter appear. Such material has been previously reduced to small particle size and water mixed with it to the proportion of 60% or so to form a slurry-like mass.

The agitator A also has a pair of chutes 38 as shown in FIG. 3 and the entire agitator as well as the elevator buckets 36 are symmetrical for operation in either direction. The elevator chains 32 and their buckets 36 operate in a gap in the material 44 as illustrated and may be driven by a sprocket 40 and motor 42. Both motors 27 and 42 are provided with suitable step-down gearing as the speed of rotation for the sprockets 26 and 42 is necessarily much slower than the rotation of the motor shaft. The step-down gearing also preferably includes a suitable means for changing the speed of rotation of the output shaft to meet varying requirements.

The agitator A is adapted to travel toward the right as shown in FIG. 3 at which time the sprockets 30 travel counterclockwise thus elevating the buckets 36 on the right or front side and lowering them on the left or back side. As the buckets speed up slightly in traveling over the top of the sprocket 30 they throw their contents into the left-hand chute 38 whereby it is fed back into the tank as illustrated. Similarly when the agitator travels toward the left the sprockets 30 will rotate clockwise and pick up material on the left side which is now the front side and discharge it through the right-hand chute 38 behind the agitator.

The agitator is operated to traverse the tank in one direction, and when it arrives at one end of the tank, the carriage and elevator are reversed so as to travel in the opposite direction. It is again reversed at the end of such travel thereby traveling back and forth throughout the length of the tank in a continuous manner. The organic material 44 is thus progressively agitated and elevated for evenly distributing the bacteria and periodically aerating each portion of the material during the digesting process.

In this connection it may be mentioned that there are two phases of digestion, a first phase of mesophilic digestion in the range of about 110° for a twenty-four hour period, then thermophilic digestion at about 140° for a further twenty-four hour period followed by a sterilization period of approximately 165° for a forty-eight hour period. After that, cooling out and partial drying may be accomplished in the apparatus disclosed or the hot material may be removed for cooling out and drying elsewhere if desired.

In a tank and agitator apparatus of the kind described, the digesting process is helped by the introduction of air at the bottom of the tank, the temperature of which may be controlled as desired. Also the addition of water particularly at the gap in the material produced by the agitator as illustrated in FIG. 3 is advantageous.

For the purpose of introducing air, I provide a plurality of pots 46 as shown in FIGS. 1 and 7 in the bottom 10 of the tank and a blower 48 for supplying air thereto. The blower 48 is driven by a motor 50 and has an air line 52 extending to manifolds 54 from which branch pipes 56 extend to a nozzle 58 in each pot 46. The nozzles may be merely pipe caps each drilled with a small opening ⅛ inch or so in diameter. The pots are filled with gravel indicated at 60 to diffuse the air discharged from the nozzles 58. As shown in FIG. 3 the agitator frame 22 carries a water pipe 62 having openings for spraying water against the adjacent wall of organic material 44 as it is elevated from the tank and returned thereto.

After the digesting period (and the cooling out and drying period if practiced in the tank) the digested material 44 may be removed from the tank by positioning the conveyor C as shown in dotted lines in FIGS. 2 and 3 and attaching it to the carriage or frame 22 for travel therewith so that as the agitator traverses the tank from left to right the conveyor C will receive the material and discharge it on a conveyor B shown in FIG. 1 adjacent the near side 12 of the tank. The conveyor B may discharge into a hopper 64 of a take-away conveyor 66 which may be of screw-type, the screw being shown at 68.

In the operation of an apparatus of the kind disclosed, the various phases of aerobic digestion, etc., may be automatically programmed or manually controlled as desired. In either event, it is desirable to have limit switches such as LS1 and LS2 in FIG. 2 to automatically reverse the travel of the agitator A and the bucket elevator carried thereby for back-and-forth operation of the agitator in a continuous manner.

During the mesophilic phase of digestion the temperature of the air discharged from the pots 46 may be regulated (thermostatically if desired) to maintain the 110° temperature within the mass of organic material 44. Likewise the thermophilic and sterilizing phases may be regulated as to the respective temperatures of 140° and 165°. Then if a cooling out and partial drying period is desired, the temperature of the air can be reduced as desired and thus the single tank and apparatus disclosed serve to completely process the organic material from undigested material with a proportion of bacteria mixed with it for initiating the digesting operation to completely digested and sterilized material suitable as a soil conditioner after it has been further dried in accordance with the method set forth in the Walker and Redd application above referred to.

From the foregoing specification it will be obvious that my apparatus is comparatively simple in construction and operation and will efficiently agitate a batch of organic material throughout the various phases of digestion, sterilization and cooling out. The agitator is so designed that in cooperation with the conveyor C the material may be removed from the tank after the processing has been completed. The next batch of material may be brought in on the conveyor B from which it may be removed by a suitable tripper conveyor (not shown) and deposited throughout the length of the tank 10, 12, 14. Thereupon the agitator can be energized for operation on the new batch of material.

Some changes may be made in the construction and arrangement of the parts of my composting apparatus without departing from the real spirit and purpose of my invention, and it is my intention to cover by my claims any modified forms of structure or use of mechanical equivalents which may reasonably be included within their scope.

I claim as my invention:

1. In a composting apparatus, an elongated tank adapted to be charged with organic material for aerobic digestion, means for periodically agitating said organic material comprising an agitator movable longitudinally of said tank and operable to progressively elevate the organic material adjacent the front of said agitator to a position above the level of the organic material in said tank and discharge it into said tank in a position adjacent the back of said agitator, and water-spray means mounted on said agitator for spraying a wall of the organic material adjacent to the agitator.

2. In a composting apparatus, an elongated tank adapted to be charged with organic material for aerobic digestion, carriage support rails mounted along opposed side walls of said tank, a wheeled carriage spanning the tank between said opposed walls for movement on said rails, means for driving said carriage along the rails, and a vertically-disposed elevator of the endless type fixed to said carriage, the discharge end thereof being disposed above said rails and the other end extending down into the tank and terminating short of the floor thereof, said elevator including means for picking up organic material adjacent the front of said elevator across the entire width of said tank, raising it to a position above said rails and discharging it behind said elevator as the elevator moves with said carriage longitudinally of said tank, whereby said elevator operates in a gap of organic material and progressively agitates said material to aerate it.

3. The apparatus of claim 2 which also includes a laterally-disposed conveyor spanning said tank and mounted on wheels on said rails for movement into a position adjacent said carriage and elevator whereby organic material may be discharged alternatively into said tank or onto said conveyor to unload said tank.

4. The apparatus of claim 3 which includes guide means mounted on said carriage for directing the flow of organic material discharged from said elevator into said tank or onto said conveyor.

5. The apparatus of claim 3 which includes guide means mounted on said carriage for directing the flow of organic material discharged from said elevator into said tank or onto said conveyor and in which said conveyor is a belt which carries organic material out of said tank.

6. The apparatus of claim 2 in which said elevator is reversible as to direction of rotation whereby it may lift organic material upwardly regardless of the direction of movement of the carriage along said rail.

7. The apparatus of claim 5 which includes a second conveyor extending longitudinally of said tank at one side thereof to receive the material from said lateral conveyor.

8. The apparatus of claim 2 which also includes means in the bottom of the tank for supplying additional air for aerating the organic material.

References Cited by the Examiner

UNITED STATES PATENTS

| | | | |
|---|---|---|---|
| 2,032,678 | 3/1936 | Wegenerq | 259—102 |
| 3,114,622 | 12/1963 | Hardy | 23—259.1 X |
| 3,156,541 | 11/1964 | Kalke | 259—138 X |

FOREIGN PATENTS

| | | |
|---|---|---|
| 521,894 | 6/1940 | Great Britain. |
| 521,939 | 6/1940 | Great Britain. |

MORRIS O. WOLK, *Primary Examiner.*

JAMES H. TAYMAN, JR., *Examiner.*